United States Patent Office 3,215,497
Patented Nov. 2, 1965

3,215,497
PROCESS FOR PREPARING HYDROGEN PEROXIDE
Hans Kunowski and Gerhard Fix, Bad Honningen am Rhine, Germany, assignors to Kali-Chemie Aktiengesellschaft, Hannover, Germany
No Drawing. Filed Aug. 28, 1962, Ser. No. 220,069
Claims priority, application Germany, Aug. 30, 1961, K 44,601
6 Claims. (Cl. 23—207)

This invention relates to a novel and improved process for producing $H_2O_2$. It has been known to produce $H_2O_2$ by a process, in which a quinone, e.g., anthraquinone is hydrogenated in the presence of a catalyst and the resulting hydroquinone is subsequently reacted with oxygen under liberation of $H_2O_2$ and regeneration of the quinone. The reducing and oxidizing steps are carried out in an organic solvent or solvent mixture, which dissolves the quinones as well as the hydroquinones. From the organic solution which contains the $H_2O_2$ and the quinone, the $H_2O_2$ is extracted with water. The quinone is used subsequently in a cycle of hydrogenation and oxidation for producing further amounts of $H_2O_2$ in a cyclic process. However, in this process various difficulties are encountered which considerably affect the economy and use of the process. Thus, the contamination of the organic solution by small amounts of metal compounds originating from the apparatus used cannot be always safely avoided and these compounds can attain a concentration, at which they cause catalytic decomposition of $H_2O_2$ in the organic solution. If said metal compounds, and even their traces, are not continuously removed from the organic reaction solution, the catalytic decomposition caused by them can result in a considerable reduction of the yield, and even the course of the reaction can be disturbed.

A further essential difficulty is encountered in the extraction of the $H_2O_2$ with water from the organic solution. It is thereby necessary to attain practically complete extraction of $H_2O_2$ by the water, without the occurrence of losses of the recycled organic solution, due to emulsification in the aqueous phase. Such emulsification can be substantially avoided at the beginning of the operation by suitable selection of the organic solvents. However, after a certain period of operation, the recycled organic solution shows the tendency to form emulsions with the water used for extraction, to an increasing extent. While fresh organic solutions show practically complete separation from the aqueous phase after extraction by the latter, after increased periods of operation the separation of the organic solution from the aqueous phase becomes increasingly slower. The separating layer shows lack of sharpness and becomes indefinite and the originally clear aqueous layer becomes turbid and milky.

The formation of emulsions can be considerably reduced by increasing the extraction temperature. However, the use of increased extraction temperatures results in losses of $H_2O_2$, because at increased temperatures increased amounts of $H_2O_2$ remain dissolved in and thus retained by the organic reaction solution.

It is possible to purify the beforementioned turbid aqueous extraction solution, e.g., by extraction with an organic solvent or by the action of a solid adsorptive agent, whereby dissolved or emulsified particles of the organic solution can be removed. However, such purification requires additional operating steps and equipment and increases the expenses of the process.

Furthermore, it is in many cases necessary to subject the recycled organic reaction solution prior to returning it to the hydrogenation step, to purification in order to remove from it traces of metals and other impurities entering it during its circulation. Such purification is usually carried out by washing the organic solution with water, which—after its use for purification—contains only very small amounts of $H_2O_2$, but may contain essential amounts of the organic solution, which are lost unelss said water is further subjected to a relatively troublesome and expensive purification.

It has been known from the art that the working solution, in which the $H_2O_2$ is formed, must be recycled many times and thereby subjected to a corresponding number of hydrogenations and oxidations. In order to increase the rate of oxidation in the oxidation process it has been suggested to carry out the oxidation in the presence of an alkaline oxidation catalyst and to use preferably alkali metal hydroxides and ammonium hydroxide. These catalysts are used in small amounts, e.g., 0.005% to 0.02% based on the weight of the working solution. They increase the rate of oxidation, but it has been found that their presence tends to cause or increase the formation of emulsions when extracting the $H_2O_2$ with water from the working solution and to render separation of the working solution from the aqueous extract difficult. In order to eliminate this harmful influence of the beforementioned alkaline oxidation catalysts, it has been suggested to add to the working solution containing the alkaline catalyst, after the oxidation a small amount of an acid, usually an amount by weight equal to and up to 3–4 times, the amount of oxidation catalyst, prior to the extraction of $H_2O_2$ with water.

Contrary to the above described prior art process, it has now been found that unexpected valuable advantages can be attained by avoiding the addition of alkaline catalyst to the oxidation solution and carrying out the oxidation in an acid reaction medium in the following manner.

After the hydrogenation step acid is added to the working solution in an amount that the pH-value of the resulting aqueous hydrogen peroxide extract is below 6, preferably in the range between 2 and 4. The oxidation is then carried out in the presence of the added acid. After oxidation the working solution is extracted with demineralized water, whereby $H_2O_2$, the acid and metallic compounds, if present, are extracted by the water, with sharp separation of the organic solution phase and the water phase, i.e. without emulsion formation.

It has been found that this procedure has the following advantages:

(a) The yield of $H_2O_2$ is increased;
(b) No emulsion-formation occurs;
(c) The working solution contains no metallic compounds;
(d) Losses and impurities in the working solution and the amount of impurities in the $H_2O_2$ extract are at a minimum.

In order to obtain an optimum effect, the solubility of the acid used in carrying out the invention should be as low as possible in the organic working solution and as high as possible in the water used for the extraction of the $H_2O_2$.

For the purposes of the invention any acid can be used which is practically insoluble in the organic reaction solution and completely soluble in water. Suitable acids are for example phosphoric acid, $HNO_3$, $H_2SO_4$, HCl, and other acids which meet the requirements of the invention, i.e. are soluble in water and practically insoluble in the anthrahydroquinone solution. In general the use of phosphoric acid will be preferred because the stabilization of the $H_2O_2$ prior to its further processing—e.g., by distillation for obtaining a more concentrated commercial product—is effected by phosphoric acid.

The amount of acid which is to be added to the working solution depends on the volume proportion of the working solution to the water used for extraction. If one volume of working solution is extracted with one volume of water 0.033 ml. of 0.1% phosphoric acid per 1 liter working solution is required to obtain a pH-value of 6 in the aqueous $H_2O_2$ extract. If it is desired that the pH-value of the aqueous $H_2O_2$ extract is 2 and if the proportion of working solution to water is 1:1, 330 ml. of a 0.1% phosphoric acid must be added to the working solution. When another acid is used the corresponding chemical equivalent amount is to be used. In any case the amount of the acid should be calculated in such a manner that the pH-value of the resulting $H_2O_2$ solution lies under 6 and preferably between 2 and 4.

The concentration of the acid used is not important. It has been found practicable, however, to use concentrations between 0.1 to 10% and not higher for ease of dosage.

Process for producing hydrogen peroxide by operations of the above type are well known and many anthraquinone compounds (and their tetrahydroderivatives), particularly the lower alkyl anthraquinones in which the alkyl group is attached in the 2-position, have been proposed as working intermediates. The working solutions in such processes comprise a solution of the anthraquanone intermediate in a water-immiscible organic solvent. Many mixed and single-component solvents have been proposed. So far as the present invention is concerned the working solution can be a solution of any anthraquinone compound, or mixture of such compounds, in any solvent or solvent mixture, which are known to be suitable for peroxide synthesizing processes of the above type.

It will be appreciated that the present invention is not limited to the materials, steps, proportions, catalysts, conditions and other details specifically described above and can be carried out with numerous variations. Thus, in addition to the quinones mentioned and/or described above, other quinone derivatives can be used as examples of which the following are mentioned: methyl-, propyl-, isopropyl-, amyl-anthraquinone, and others.

The following examples illustrate some embodiments of and best modes for carrying out the invention, to which the invention is not limited.

*Example 1*

This example shows the results obtained without the addition of acid to the working solution prior to the oxidation phase.

In a conventional recycling apparatus 10 liters of a solution of 120 g. of 2-ethylanthraquinone in 380 g. of octyl alcohol and 500 g. of benzol were hydrogenated per hour, oxidized, extracted with water and subsequently subjected again to hydrogenation. Hydrogenation was carried out with Raney nickel catalyst, using 1–2% by weight based on the weight of the recycling solution.

Hydrogenation was continued at a temperature of 25° C. until 4 volumes of hydrogen were absorbed per volume of the recycling solution. Thereby 37.4 g./kg. ethylanthraquinone were converted into the hydroquinone form. Subsequently the catalyst was quantitatively removed, before the recycle solution which now contains 2-ethylanthraquinone partly in hydroquinone form is oxydized again by passing air through it at a temperature of 30° C. The air was conducted in excess through the solution until about 4 volumes oxygen were absorbed per volume of the recycle solution. The time of stay of the recycle solution in the oxidation phase amounted to 30 minutes.

After the oxidation the $H_2O_2$-content of the recycle solution amounted to 4.83 g./kg. and this corresponds to a yield of 90.4% of the theory calculated on the 2-ethylanthrahydroquinone content present after hydrogenation. Subsequently the $H_2O_2$-containing working solution was extracted with demineralized water.

Depending on the proportion between the organic phase and the extraction water, the $H_2O_2$ solutions obtained are more or less concentrated. The yield in the extraction step is influenced by the known factors, such as the distribution equilibrium of the $H_2O_2$ between the two phases, the temperature, the number of steps of the extraction plant, etc.

In the present case, the proportion of the organic to the aqueous phase was=2:1 parts by weight.

At a pH value of the aqueous $H_2O_2$ of 6.6, this layer had a milky turbid appearance. The aqueous solution still contained about 100 mg. organic solution/kg. The concentration of $H_2O_2$ amounted to 8.94 g./kg. This corresponds to a yield in the extraction of 92.5%.

In another test, in the same solvent mixture 120 g. 2-tert.-butylanthraquinone was dissolved. The process was carried out in the same manner, but the hydrogenation was carried out at about 40° C., and only 3.5 volumes of $H_2$ were required for one volume of working solution and accordingly one volume working solution required for oxidation only about 3.5 volumes of $O_2$. The difference between the hydroquinone content prior to and after the oxidation amounted to 41.5 g./kg. of working solution. After oxidation the $H_2O_2$-content of the solution amounted to 4.56 g./kg. working solution. This corresponds to a yield of 86% of the theory during oxidation. In this test, too, the proportion by weight of organic to aqueous phase is 2:1. At a pH value of the aqueous phase of 6.7 this phase was weakly milky-yellow. The aqueous solution still contained 120 mg/kg. recycle solution. The concentration of $H_2O_2$ amounted to 8.4 g./kg. This corresponds to a yield of 92% in the extraction.

*Example 2*

10 liters of a solution as described in the above Example 1 with the formation of ethylanthraquinone, was alternately hydrogenated and oxidized. The conditions used were the same as stated in the above Example 1, however in this test prior to the oxidation per kg. of the recycle solution 15 ml. of phosphoric acid of 0.1% were added. After oxidation, the $H_2O_2$ was extracted from the organic solution with demineralized water in the proportion of 2 parts by weight of organic solution to 1 part of water. After extraction the aqueous solution had a pH value of about 3. In this case during hydrogenation 38.2 g./hydroquinone/kg. recycle solution was formed. This amount of hydroquinone was oxidized again with air under the conditions stated in the above Example 1, and thereby simultaneously 5.4 g. $H_2O_2$/kg. organic working solution was obtained. This corresponds to a yield of $H_2O_2$ during oxidation, to 98.2% of the theory.

In this case, too, the organic phase was extracted with demineralized water in the proportion by weight of 2:1. However the pH value of the aqueous $H_2O_2$ was in this case about 3. The aqueous solution was only slightly turbid and contained only about 40 mg. of organic solution per kg. The concentration of $H_2O_2$ amounted to 10.36 g./kg. This corresponds to a yield in the extraction of 96%.

*Example 3*

In further tests which were carried out in a manner similar to that described in the above Example 2, instead of phosphoric acid an aqueous nitric acid solution having a concentration of 0.25% was added. The results are shown in the following table, in which the first column indicates the number of the test; column 2 the anthraquinone compound used; column 3 the actually oxidized amount of hydroquinone in g./kg.; column 4 the amount of $H_2O_2$ in g./kg. of organic solution; column 5 indicates the yield during oxidation:

| (1) | (2) | (3) | (4) | (5) |
|---|---|---|---|---|
| 1 | 2-tert. butyl-anthraquinone | 46.7 | 5.9 | 99 |
| 2 | ----do---- | 54.4 | 6.78 | 97.5 |

It will be appreciated from the above that the present invention is not limited to the various details specifically described above and can be carried out with modifications. Thus, in addition to the quinones used in the above examples other quinone derivatives can be used. The oxidation is carried out in acid working solution in the manner described above, but otherwise under conventional conditions, i.e., catalysts, solvents, temperatures, etc. Oxidation can be carried out with oxygen or air.

As further examples of solvent which can be used for preparing the working solution toluene and xylene should be mentioned but many other solvents known in the art or binary or ternary solvent mixtures can be used in carrying out the invention.

What is claimed is:

1. In a cycle process for the production of hydrogen peroxide, comprising the hydrogenation of a working solution consisting of an anthraquinone compound dissolved in an organic water-immiscible solvent in order to convert the anthraquinone compound to the corresponding anthrahydroquinone compound, subsequent oxidation of the hydrogenated solution with elemental oxygen, to produce the anthraquinone compound and hydrogen peroxide and separating the hydrogen peroxide from the oxidized working solution by extraction with demineralized water and recycling the separated working solution for further hydrogenation, the improvement which consists in carrying out oxidation of the dissolved anthrahydroquinone with the addition to the anthrahydroquinone solution of a water-soluble acid which is practically insoluble in the anthrahydroquinone solution, in such amount that the aqueous $H_2O_2$-solution extracted from the oxidized solution has a pH value of less than 6.

2. A process as claimed in claim 1 in which the acid which is added to the working solution after the hydrogenation step is used in such an amount that the aqueous $H_2O_2$-solution extracted from the oxidized solution has a pH value of 2 to 4.

3. A process as claimed in claim 1, in which the acid which is used for the acidification of the anthrahydroquinone solution is phosphoric acid.

4. A process as claimed in claim 1, in which the acid which is used for acidification of the anthrahydroquinone solution is $HNO_3$.

5. A process as claimed in claim 1, in which the acid which is used for acidification of the anthrahydroquinone solution, is $H_2SO_4$.

6. A process as claimed in claim 1, in which the acid which is used for acidification of the anthrahydroquinone solution, is HCl.

References Cited by the Examiner
UNITED STATES PATENTS

| | | | |
|---|---|---|---|
| 2,901,490 | 8/59 | Sprauer | 23—207 X |
| 2,995,424 | 8/61 | Farrell | 23—207 |

MAURICE A. BRINDISI, *Primary Examiner.*